United States Patent [19]

Sattar et al.

[11] Patent Number: 6,154,728
[45] Date of Patent: Nov. 28, 2000

[54] APPARATUS, METHOD AND SYSTEM FOR DISTRIBUTED AND AUTOMATIC INVENTORY, STATUS AND DATABASE CREATION AND CONTROL FOR REMOTE COMMUNICATION SITES

[75] Inventors: Wamiq Sattar, Algonquin; William Walter Demlow, Woodridge; Bindu Shrivastav, Naperville, all of Ill.

[73] Assignee: Lucent Technologies Inc., Murray Hill, N.J.

[21] Appl. No.: 09/067,277

[22] Filed: Apr. 27, 1998

[51] Int. Cl.[7] ........................................ G06F 17/60
[52] U.S. Cl. .................... 705/28; 705/14; 705/22; 702/182; 702/183; 702/184; 702/185; 702/186; 714/4; 714/11; 714/712; 710/9; 710/10; 710/104
[58] Field of Search .................... 705/28, 14, 22; 340/815.65, 825.06, 825.07, 825.08, 825.43, 825.53, 825.65, 825.44; 702/182–185; 714/4, 11, 712; 710/9, 10, 104

[56] References Cited

U.S. PATENT DOCUMENTS

| | | | |
|---|---|---|---|
| 4,873,687 | 10/1989 | Breu | 714/14 |
| 4,881,230 | 11/1989 | Clark et al. | 714/712 |
| 4,888,771 | 12/1989 | Benignus et al. | 714/26 |
| 5,091,713 | 2/1992 | Horne et al. | 340/501 |
| 5,127,012 | 6/1992 | Hiliger | 702/184 |
| 5,220,668 | 6/1993 | Bulls | 709/102 |
| 5,287,505 | 2/1994 | Calvert et al. | 707/10 |
| 5,293,556 | 3/1994 | Hill et al. | 702/184 |
| 5,469,434 | 11/1995 | Kurdzo et al. | 370/364 |
| 5,586,050 | 12/1996 | Makel et al. | 702/51 |
| 5,818,343 | 10/1998 | Sobel et al. | 340/815.65 |
| 5,909,437 | 6/1999 | Rhodes et al. | 370/439 |
| 6,044,411 | 3/2000 | Berglund et al. | 710/9 |

Primary Examiner—Eric W. Stamber
Assistant Examiner—Romain Jeanty
Attorney, Agent, or Firm—Nancy R. Gamburd

[57] ABSTRACT

An apparatus, method and system are provided for automatic and distributed inventory processing for remote communication sites, such as remote cellular sites. A system embodiment includes a central site having a central processor, such as a mobile switching center, and a multitude of remote communication sites, with each remote communication site having a plurality of field replaceable units; and further having a remote processor and a remote memory. The remote processor includes instructions for obtaining an address and status from the memory of each field replaceable unit within the remote communication site and for querying each field replaceable unit having a status not out of service to obtain its vintage information and its physical location information. In the preferred embodiment, the physical location information includes frame, shelf and slot locations, and the vintage information includes hardware and firmware versions. The inventory information may also be compiled into a database, preferably at the central site.

54 Claims, 5 Drawing Sheets

APPARATUS, METHOD AND SYSTEM FOR DISTRIBUTED AND AUTOMATIC INVENTORY, STATUS AND DATABASE CREATION AND CONTROL FOR REMOTE COMMUNICATION SITES

FIELD OF THE INVENTION

The present invention relates in general to inventory and status ascertainment and management for communication systems, such as cellular telecommunication systems. More particularly, the present invention relates to an apparatus, method and system for distributed and automatic inventory, status and database creation and control for remote communication sites, such as remote cellular base stations utilized in cellular telecommunication systems.

BACKGROUND OF THE INVENTION

Many modern communication sites, such as remote cellular telecommunication base stations, each contain hundreds of thousands of circuit boards and cards referred to as "field replaceable units" ("FRUs"). These FRUs, such as cellular circuit boards, circuit packs, circuit cards, and other electronic or optical hardware utilized in modern telecommunication systems, perform a wide variety of telecommunication functions. FRUs perform, for example, call processing, management of every cellular communication session within a cellular site physical range or vicinity, and code division multiple access ("CDMA") processing.

The FRUs are typically connected within a telecommunication network in large, rack or frame mounted systems, in which each rack or frame contains numerous shelves, and each shelf contains numerous slots. Each FRU is typically insertable into and removable from such a slot. For mobile switching centers ("MSCs") provided by, for example, Lucent Technologies, Inc., each MSC may have 222 cell sites (or base stations), with 553 boards (FRUs) per full cell site, resulting in 122,766 FRUs in only one MSC. Switching centers provided by other manufacturers also have a comparable number of FRUs, typically also over 100,000 per mobile switching center. In addition, most cellular telecommunication providers utilize many mobile switching centers in a particular locality, and many cellular telecommunication providers operate in numerous localities. As a consequence, many cellular telecommunication providers potentially utilize a vast number of FRUs in a particular region, having an order of magnitude in the millions to hundreds of millions or more.

Inventory and management of such a significant number of FRUs is, obviously, an extraordinarily difficult task. Such a task is even greater because not only are there a huge number of FRUs, but also there are a wide variety of FRUs performing a wide variety of communication functions. These FRUs a re typically printed circuit boards containing complex hardware, such as multiple microprocessors, memory chips, digital signal processors ("DSPs") and other integrated circuits ("Ics"), with complex software and firmware providing and controlling such communication functions. In addition, with the growth and expansion of telecommunication services, as telecommunication providers have added capacity over time, many of the FRUs in service are of different "vintages," having different hardware, different firmware, and different software capabilities. In addition, any number of these FRUs with different or similar vintages also may have been purchased and placed into service at different times, may have different repair histories, may have different usage histories, and may have different warranty requirements.

As a consequence, a need remains for an apparatus, method and system to provide for inventory management and control for the potentially vast number of FRUs in a remote communication site. Such an apparatus, method and system should be able to inventory and track each FRU, its status, its location, its serial number, and its hardware and firmware (or other software) vintages. In addition, such an apparatus, method and system should be able to compile such an inventory into a database readily available to and useable by service providers for, among other things, warranty and history tracking. Moreover, such an apparatus, method and system should be automatic, capable of providing such an inventory and database without user intervention, and also capable of providing such an inventory and database upon user demand. Lastly, such an apparatus, method and system should be capable of remotely accessing a multitude of remote sites from a central location.

SUMMARY OF THE INVENTION

The present invention provides for an apparatus, method and system for automatic and distributed inventory processing for remote communication sites, such as for remote cellular sites. A preferred system embodiment includes a central site, such as a mobile switching center, and a multitude of remote communication sites, with each remote communication site having a plurality of field replaceable units. The central site, each remote communication site, and most FRUs, have "intelligence" embodied in a processor, such as a microprocessor, and associated memory.

On an automatic basis, the remote site (such as a remote cellular site) performs an inventory process on each FRU within the site, and periodically transmits a compilation of this information to the central site (such as an MSC). More specifically, the remote processor includes instructions for obtaining an address and status (from memory or by query/interrogation of an FRU processor) of each field replaceable unit within the remote communication site. For those FRUs having a status which is compatible with queries or other interrogations, such as an active or standby status, the remote processor queries each field replaceable unit to obtain its vintage information and its physical location information. In the preferred embodiment, the physical location information includes frame, shelf and slot locations, and may be expanded to include other location information, such as floor and bay (or isle) locations within the site. Also in the preferred embodiment, the vintage information includes hardware and firmware versions, and other vintage information may include software versions, FRU serial numbers, and any other desired information about the FRU, such as installation dates, repair dates, and repairing technician names. This inventory information is or may be also preferably compiled into a database at the central site, and may be directly utilized in other applications for managing the remote sites.

The advantages of the various embodiments of the present invention are truly significant. First, in accordance with the present invention, a detailed inventory of a vast number of FRUs may be performed remotely, without any personal visit to the particular remote cellular site, and may be performed automatically, without any user intervention or input. In the past, such a detailed inventory, if performed at all, would have had to be performed physically by an operator or technician, personally examining each individual FRU in every slot, shelf and frame.

Second, the automatic inventory provided by each of the remote sites provides significant information, such as whether or not a particular FRU has an appropriate level of hardware and firmware to support new control software as an upgrade, which may then be remotely downloaded. Moreover, every change in the configuration of the remote site may be monitored and tracked, such as the replacement of defective components, the repair history of various components, and aging information for warranty renewal.

Third, the utilization of this remote and automatic inventory allows for immediate creation of a centralized database. This also allows for a significant reduction in maintenance costs, allowing such inventory control and database creation without additional personnel and staffing. Such detailed and automatic knowledge, moreover, also provides for greater flexibility in management of the remote cellular site, including load balancing, such as adding or subtracting capabilities on an as needed basis.

Numerous other advantages and features of the present invention will become readily apparent from the following detailed description of the invention and the embodiments thereof, from the claims and from the accompanying drawings.

DETAILED DESCRIPTION OF THE INVENTION

As mentioned above, a need remains for an apparatus, method and system to provide for inventory management and control for the potentially vast number of FRUs in a remote communication site. The present invention provides for such an apparatus, method and system, with the capability to inventory and track each FRU, its status, its location, its serial number, and its hardware and firmware (or other software) vintages. In addition, this detailed inventory may be compiled into a database readily available to and useable by service providers. Moreover, this inventory process is automatic, capable of providing such an inventory and database without user intervention, and is also capable of providing such an inventory and database upon user demand. Lastly, the apparatus, method and system of the present invention capable of remotely accessing a multitude of remote sites from a central location.

Figure 1:
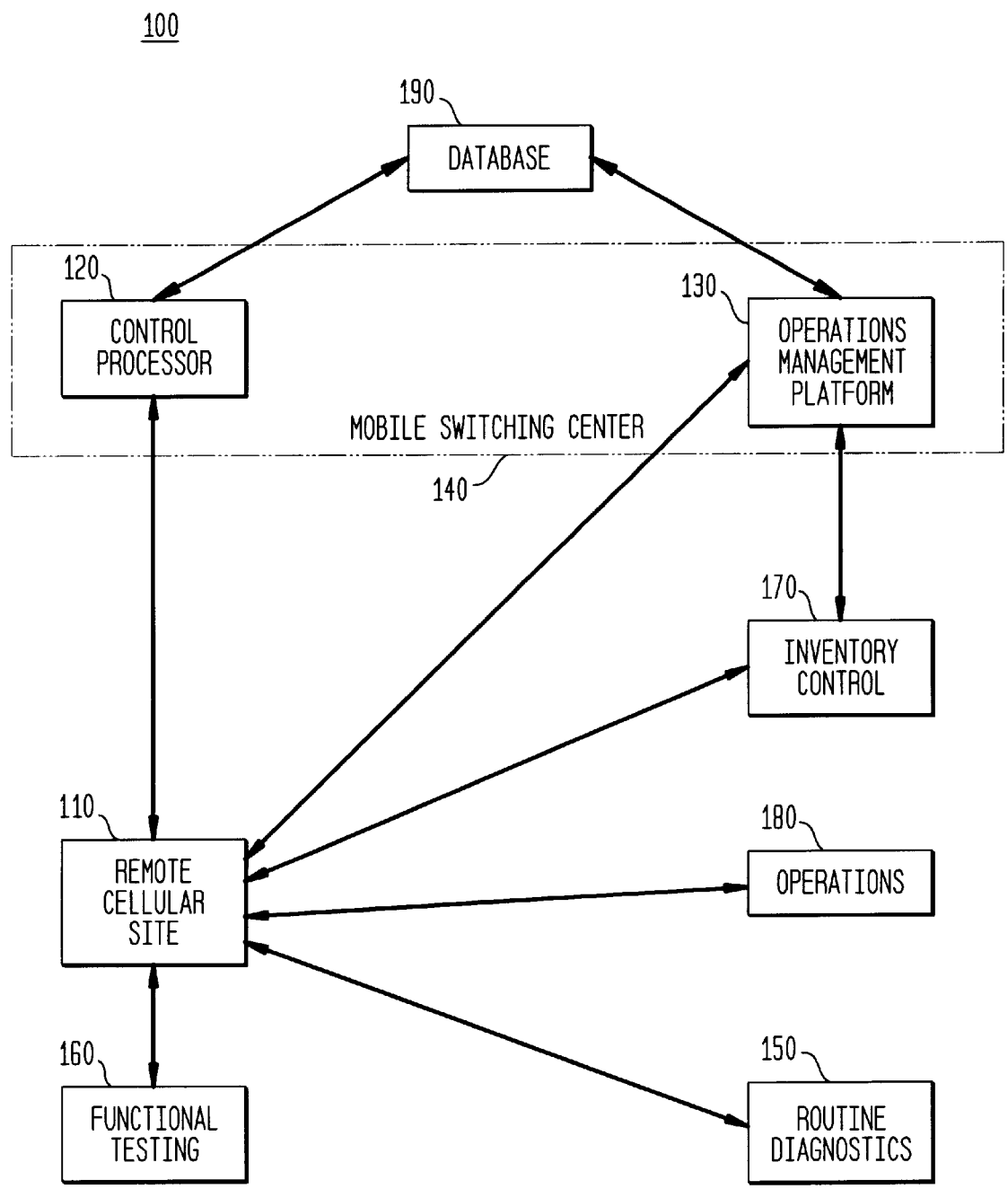
FIG. 1 is a block diagram illustrating a first system embodiment in accordance with the present invention.

FIG. 1 is a block diagram illustrating a first system embodiment in accordance with the present invention. As illustrated in FIG. 1, the system 100 of the present invention includes a remote cellular site 110, a control processor 120, and typically an operations management platform 130. The remote cellular site 110 may also be any remote site containing FRUs, or another equivalent remote communication site, and is illustrated as a cellular site for the preferred system embodiment of the invention. The control processor 120 and operations management platform 130 are also typically part of a mobile switching center 140. In equivalent system embodiments, however, the functionality of the control processor 120 and operations management platform may be distributed in numerous ways, and may also be included within the remote cellular site 110 if desired.

As discussed in greater detail below with regard to FIG. 5, under the control of the control processor 120, the remote cellular site 110 may have various states, including a routine diagnostic state 150, a functional testing state 160, an inventory control state 170, and an operational state 180. In accordance with the present invention, the inventory control state 170 is also utilized in the generation and maintenance of a database 190.

Continuing to refer to FIG. 1, the control processor 120 (preferably within the MSC 140) will issue and transmit various commands or requests to the remote cellular site 110 to self-identify during the inventory control state 170, sequentially identifying each and every field replaceable unit within the remote cellular site 110. In response to these various identification requests (or queries), in the preferred embodiment, the remote cellular site 110 identifies each FRU by: (1) the name (or type) of the board and its sub-units; (2) its location within the remote cellular site 110 by frame, shelf, and slot; (3) its hardware version; (4) its firmware version; (5) its serial number; and (6) its status (namely, active, standby or out of service). In the preferred embodiment, the status information may also be expanded to include other status types, such as empty or unequipped, or currently under testing phases (equipment in place but prior to coming on line). Also in the preferred embodiment, the serial number information may be optionally included, depending upon processor 120 capacity. In addition to hardware and firmware versions, other "vintage" information may also be included, such as software versions residing within each type of processor on the FRU. Other location information may also be included, such as floor, bay and isle. This inventory control information is then transmitted by the remote cellular site 110 to the mobile switching center 140, which in turn utilizes the information to create, maintain, and modify the database 190. Also in accordance with the present invention, this inventory control state 170 may be entered on demand (by an operator or technician, by entering or inputting a command via an interface within the operations management platform 130, such as an input terminal (not separately illustrated)), or may be automatically programmed to run at any desired or predetermined frequency, such as providing an automatically updated database on an hourly, daily or weekly basis. In addition to having an interface for technician or operator input, in the preferred embodiment, the operations management platform 130 also has printing and memory capability, for output of the updated database and incorporation of the database into other applications and programs of the service provider.

The power of the system 100, with its inventory control state 170 and database 190, is vast and should not be underestimated. In the past, such an inventory, if performed at all, would have had to have been performed physically by an operator or technician, personally examining each individual FRU in every slot, shelf and frame. In accordance with the present invention, however, such an inventory may be performed remotely, without any personal visit to the particular remote cellular site 110, and may be performed automatically, without any user intervention. The self-identification by the remote cellular site 110 provides significant information, such as whether or not a particular FRU has an appropriate level of hardware and firmware to support new control software as an upgrade (also preferably remotely downloaded into the remote cellular site 110). In addition, the present invention provides that every change in the configuration of the remote cellular site 110 may be monitored and tracked, such as the replacement of defective components, the repair history of various components, and aging information for warranty renewal. The benefits of this remote and automatic database creation include a significant reduction in maintenance costs, allowing such inventory control and database creation without additional personnel and staffing. Such detailed and automatic knowledge, moreover, also provides for greater flexibility in management of the remote cellular site 110, including load balancing, adding or subtracting capabilities on an as needed basis. The serial number information also enables a repair history to be tracked and evaluated, enabling a determination such as a particular type of FRU from a certain manufacturer either is repair free or conversely has had a significant performance problem.

Figure 2:
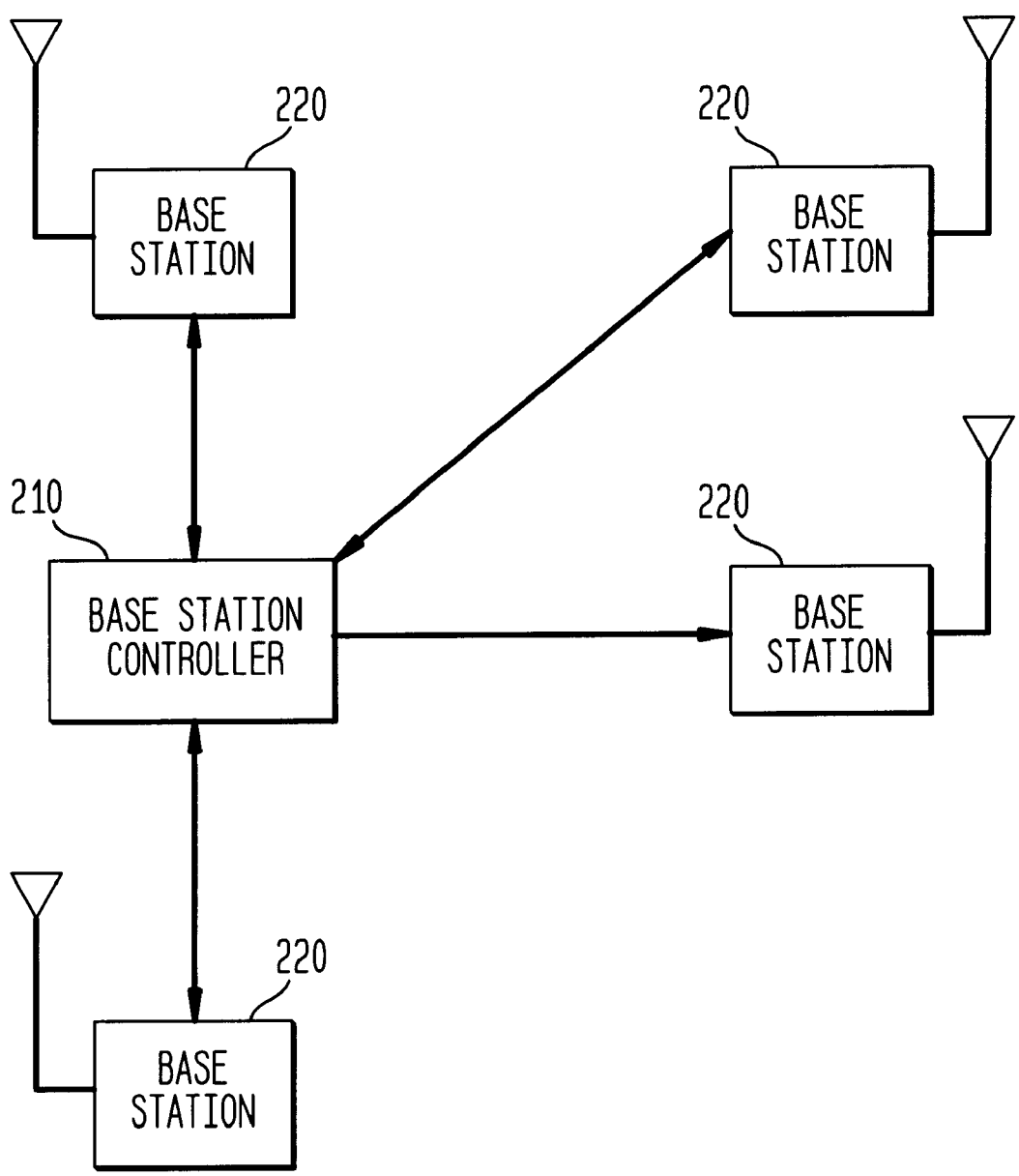
FIG. 2 is a block diagram illustrating a second system embodiment in accordance with the present invention.
Figure 3:
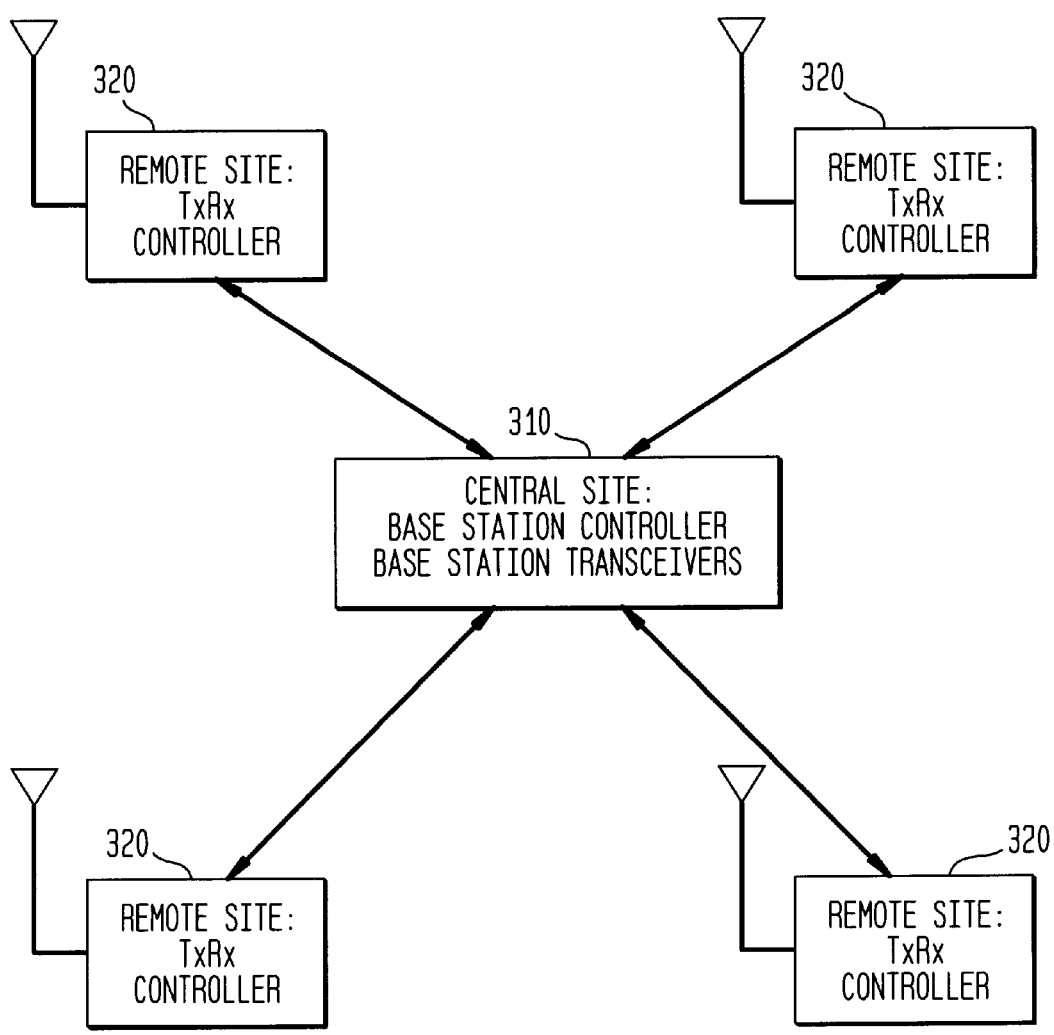
FIG. 3 is a block diagram illustrating a third system embodiment in accordance with the present invention.

FIGS. 2 and 3 illustrate other system embodiments of the present invention. More particularly, FIG. 2 is a block diagram illustrating a second system embodiment in accordance with the present invention. FIG. 2 illustrates a system 200 having a centrally located base station controller 210 and a plurality of remotely located base stations 220. Equivalently to the system 100, each base station 220 may be considered to be a remote cellular site 110, and the base station controller 210 may be part of the mobile switching center 140 or may be included within the remote cellular site 110. In this system configuration, the functionality of the control processor 120 and the operations management platform 130 may be distributed between and among any of the various base stations 220 and base station controller 210.

FIG. 3 is a block diagram illustrating a third system embodiment 300 in accordance with the present invention, having a central site 310 and a multitude of remote sites 320, also having a distributed functionality (which would otherwise be contained in the control processor 120 and the operations management platform 130). In this third system configuration 300, the central site 310 includes a base station controller and base station transceivers, and the remote sites 320 include transmitter receivers with controllers. As mentioned above with respect to FIG. 2, with regard to the functionality of the present invention, each base station 220 or remote site 320 equivalently may be considered to be a remote cellular site 110, and the base station controller 210 or central site 310 equivalently may be part of the mobile switching center 140 or may be included within the remote cellular site 110. Referring again to FIG. 3, in this system configuration 300, the functionality of the control processor 120 and the operations management platform 130 may be distributed between and among any of the various remote sites 320 and central site 310.

As may be apparent from the above discussion, with regard to the various system configurations illustrated in FIGS. 1–3, the inventory and database control functionality may be implemented and distributed in any number of equivalent ways. For purposes of the present invention, the system need only have, first, a centrally located site, such as an MSC 140, a base station 220 or a central site 310; and second, a plurality or multitude of remotely located sites, such as remote cellular site 110, base stations 220, or remote sites 320. In accordance with the system embodiment of the present invention, such remotely located sites are queried for inventory information by the centrally located site. In response to such queries, each remotely located site will self-identify and provide the various inventory information as discussed above with respect to FIG. 1. The resulting compilation of inventory information forming a database may be located in any convenient or otherwise desired location; in the preferred embodiment, the database is located in the MSC 140 as a central location providing for ease of access.

Figure 4:
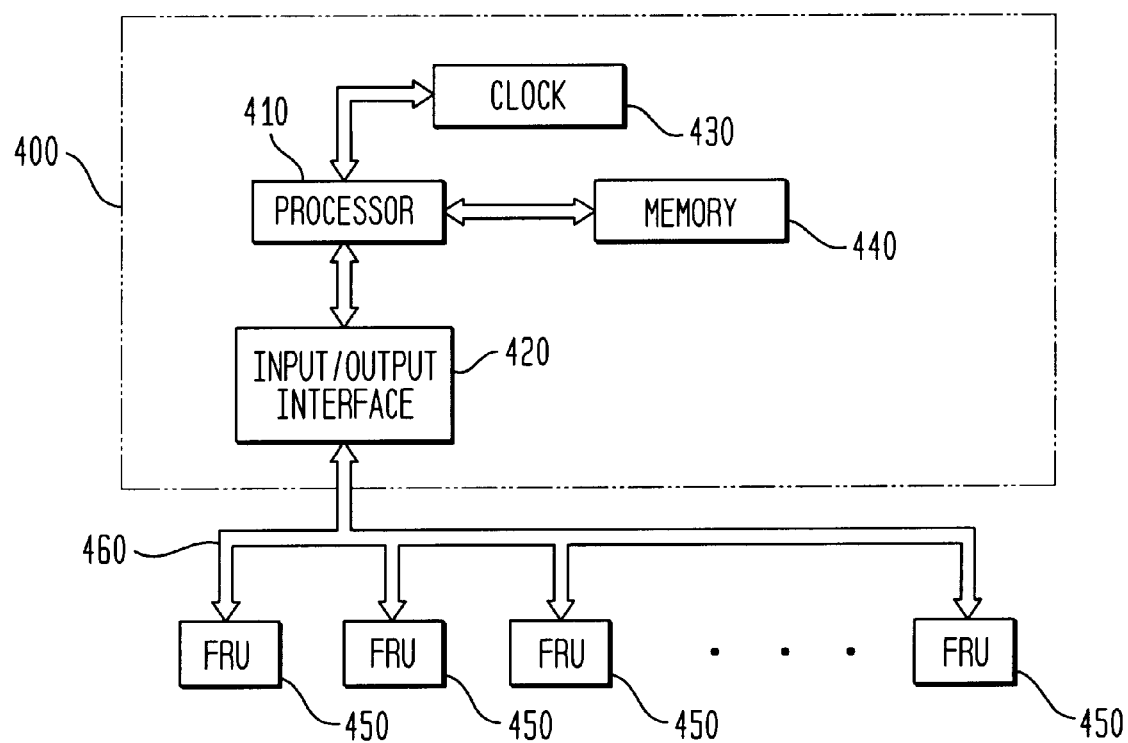
FIG. 4 is a block diagram illustrating an apparatus embodiment in accordance with the present invention.

Such distributed functionality is further illustrated in FIG. 4. FIG. 4 is a block diagram illustrating an apparatus embodiment in accordance with the present invention. This apparatus 400 may be centrally located, such as within an MSC 140; may be remotely located, such as within a remote cellular site 110; or may be distributed among such central and remote locations. The apparatus 400 includes a processor 410, an input and output ("I/O") interface 420, a clock 430, and memory 440. In the preferred embodiment, the I/O interface 420 is preferably a network interface or other communication interface connected or connectable to a network or communication channel 460. For example, when the apparatus 400 is located within a remote cellular site 110, the I/O interface 420 may be coupleable to a bus or a backplane (such as communication channel 460) within each frame of FRUs, for communication with each FRU within the particular frame. Through the communication channel 460, the apparatus 400 is coupleable to a plurality of FRUs 450, such as every FRU within a remote cellular site 110. The clock 430 is utilized in the preferred embodiment to provide time information to the processor 410, such that at a predetermined or preselected time (which may be programmed into the processor 410), the processor 410 will query the FRUs 450 for inventory information as discussed above. For example, the processor 410 may be programmed to conduct the inventory at off-peak communication times on a daily basis, such as every day at 3 a.m. As each FRU 450 responds to the queries and transmits its inventory information to the apparatus 400, the inventory information is stored in the memory 440, which may be an integrated circuit, a magnetic hard drive, or any other form of memory device.

Continuing to refer to FIG. 4, the processor 410 may include a single integrated circuit ("IC"), or may include a plurality of integrated circuits or other components connected, arranged or grouped together, such as microprocessors, DSPs, application specific integrated circuits ("ASICs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed in greater detail below, with associated memory, such as microprocessor memory or additional RAM, ROM, EPROM or $E^2$PROM. As discussed in greater detail below with reference to FIG. 5, the methodology of the invention may be programmed and stored, in the processor 410 with its associated memory and other equivalent components, as a set of program instructions for subsequent execution when the processor 410 is operative (i.e., the processor 410 is powered on and functioning).

Figure 5:
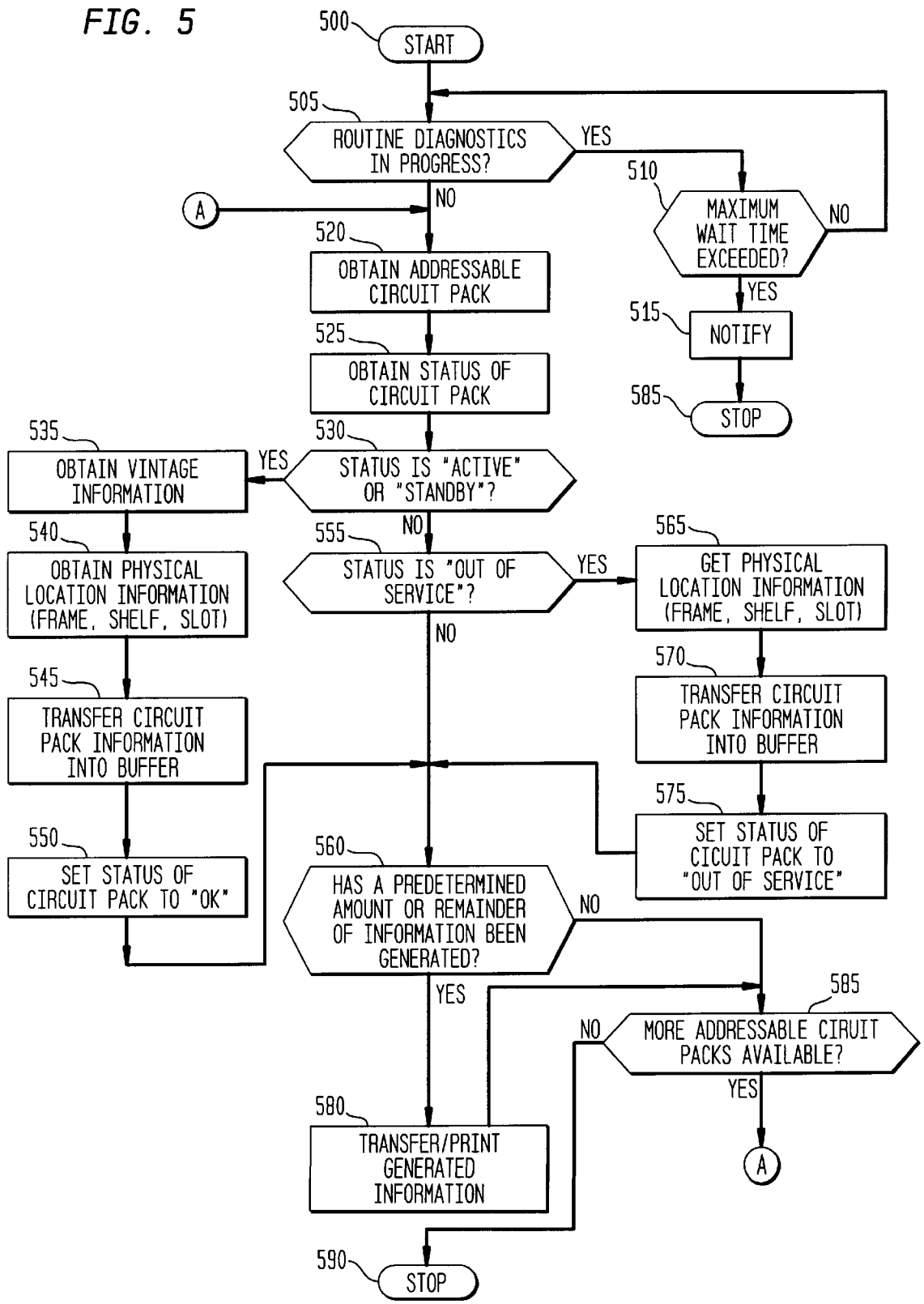
FIG. 5 is a flow diagram illustrating a method embodiment in accordance with the present invention.

FIG. 5 is a flow diagram illustrating a method embodiment in accordance with the present invention. Referring to FIG. 5, the method begins, start step 500, with determining whether routine diagnostics (state 150, FIG. 1) are in progress, step 505. When routine diagnostics are in progress in step 505, the method waits until the diagnostics are completed, determining in step 510 if the maximum wait time has been exceeded. When the maximum wait time has not been exceeded in step 510, the method returns to step 505 and continues to monitor whether routine diagnostics are in progress. When routing diagnostics are in progress in step 505 and when the maximum wait time has been exceeded in step 510, the method proceeds to step 515, providing a notification that the inventory process could not be executed at that time, and the method ends, stop (or return) step 590.

When routine diagnostics are not in progress or have been completed, step 505, the method proceeds to step 520 and obtains or selects an address of an addressable FRU (circuit pack) from the then currently available database list of all addressable FRUs within the remote cellular site. In the preferred apparatus embodiment, the processor 410 obtains each FRU address from the memory 440. In the preferred embodiment, this initial or current list of addressable FRUs is generated and updated as any new FRU is added or replaced, typically through a "plug and play" feature of the FRU or by direct input from the installing technician. Future embodiments also may include obtaining such address information through an address query to the FRU, which is programmed to provide and transmit its address information back to the processor 410. In addition, FRUs with multiple processors or multiple functionalities may also have multiple addresses, with each address corresponding to the particular processor/functionality.

Proceeding to step 525, the method then obtains the then current status of the selected (or particular) addressable FRU, also preferably from the memory 440. In an alternative embodiment, the processor 410 may generate and transmit a status query to the selected FRU 450 which, in turn, has been programmed to provide and transmit its status response back to the processor 410, such as whether the FRU is active, on standby, or out of service. When the status of the particular addressable circuit pack is active or standby in step 530, the method proceeds to step 535 and through the query and response procedure mentioned above, obtains the vintage information concerning that particular FRU. More particularly, the processor 410 generates and transmits a vintage query to the selected FRU 450 which, in turn, also has been programmed to provide and transmit, back to the processor 410, information concerning its equipment type (model number or model name), and its hardware and firmware configurations. In various alternative embodiments, the vintage information may also include the latest software upgrade or release of the FRU 450, may include a Bellcore Common Language Equipment Identifier code ("CLEI"). Depending upon available processing and memory capability of the selected FRU, other information which may be categorized as vintage information may also be queried, with a corresponding response, as an additional step or as part of the vintage query/response step. Such other vintage information may include serial number (or part number), operating protocols, physical descriptions such as board height and width, conditioning information (such as for reworked equipment), installation date, and installing technician name or other identifiers.

Next, in step 540, the method obtains the physical location information for the particular, selected FRU, preferably by frame, shelf and slot numbers. As mentioned above, other location information may also include site number or location, building location, floor number, room, bay or isle numbers or locations, other building coordinate information, and other site information, such as the number of slots per shelf and the number of shelves per frame or rack. Also as a potential additional step, or as part of steps 535 or 540, other capacity information may be queried, such as high or low bandwidth capacity, and high or low port capacity. The complete inventory information, preferably consisting of address, location (frame, shelf and slot), vintage (equipment type, hardware, firmware and potentially software versions), status, and potentially serial number, CLEI and other optional information mentioned above, is then transferred into a buffer (such as memory 440), step 545, for current or subsequent transmission to the mobile switching center 140 or equivalent centrally located site. Following step 545, the status of the particular FRU is updated or reset to its active or standby status ("OK" in the preferred embodiment), step 550, and preferably stored in the memory 440.

Continuing to refer to FIG. 5, when the status of the selected FRU is not active or standby in step 530, the method proceeds to step 555 to determine whether its status is out of service, step 555, also through the memory 440 or alternatively through the status query and response process. When the status is out of service in step 555, the preferred method proceeds to step 565 to obtain the physical location information of the particular FRU, such as by frame, shelf and slot, from a memory location (such as memory 440). This information preferably is obtained from a memory location rather than through a location query and programmed response process, as the particular board to be queried might not exist at that location for example, if removed for servicing. This circuit pack information is then transferred into the buffer (such as memory 440), step 570, and the status of the circuit pack is reset to or otherwise verified as out of service, step 575.

Following steps 550 and 575, or following step 555, the method determines whether a predetermined amount of inventory information has been generated, step 560. In the preferred embodiment, for efficiency and to avoid potential interference with call processing, utilizing step 560, the method waits to transmit the inventory information to a centrally located site until a predetermined number of FRUs have been queried, with the information (responses) obtained and assembled into data packets for subsequent transmission. Alternatively, such transmission to a central site may occur in any number of ways, such as on an individual, one by one FRU basis, or continuously as the information is generated. In the preferred embodiment, data packets having inventory information for 15 FRUs are compiled within a remote cellular site 110 and transmitted to a mobile switching center 140. (As an exception, when no more FRUs are left which have not been queried, all remaining inventory information is also compiled and transmitted). When this predetermined amount, remainder, or individual FRU information has been generated in step 560, the method proceeds to transfer this inventory information and, in the preferred embodiment, print the inventory information, step 580. In the preferred embodiment, this inventory information is transmitted to (and printed at) a central location, such as a mobile switching center 140, and further compiled into a database or used to update a current database in the operations management platform 130. Following step 580, or when a predetermined amount of information has not yet been generated in step 560, the method determines whether there are any more addressable FRUs available to also inventory within a particular remote cellular site 110, step 585. When there are more addressable FRUs in step 585, the method returns to step 520 to continue the process for each such addressable FRU. When there are no more addressable FRUs in step 585, the method is complete and may end, stop step 590.

As indicated above with respect to FIG. 4, each FRU 450 in a rack or frame is typically connected, via a communication channel 460 such as a bus or a backplane, to a processor 410 (via I/O interface 420). In such frame or rack-mounted systems, there is typically a messaging or communication protocol developed by the particular manufacturer of the system. Lucent Technologies, for example, has developed a new system architecture referred to as FLEXENT™, replacing the current AUTOPLEX® system architecture. In the FLEXENT architecture, the various queries and responses mentioned above, such as status and vintage queries and responses, will have their own specific format and code. In the Lucent Technologies system, also for example, the "OP:CELL xxx,INVENTORY" command will invoke the inventory control process for the remote cellular site number "xxx", and perform the entire inventory process discussed above on all addressable FRUs in that cellular site. Similarly, a new command, the "OP:CELL xxx, INVENTORY yyy" command, can invoke the inventory control process for a single cell site, a range of cell sites, or a list of cell sites (separated by commas and enclosed in parentheses), for the "xxx" parameter. In this new command, the "yyy" parameter is utilized to designate a particular device or range of devices to be inventoried, with all devices designated as a default. For example, "CCC" may be entered as a "yyy" parameter to inventory all Channel Control Cluster units as a default setting.

The inventory information may be compiled and stored in any number of equivalent formats. Such formats may be determined, for example, based upon database requirements, for existing or future implementations. As a consequence, the compiled inventory information may be generated (or encoded) and stored in any binary format compatible with a predetermined or preselected database format or database implementation, such as INFORMIX, ORACLE, or simply ASCII code formats.

Numerous advantages of the various embodiments of the present invention are readily apparent from the above discussion. First, in accordance with the present invention, a detailed inventory of a vast number of FRUs may be performed remotely, without any personal visit to the particular remote cellular site, and may be performed automatically, without any user intervention or input. In the past, such an inventory, if performed at all, would have had to be performed physically by an operator or technician, personally examining each individual FRU in every slot, shelf and frame, at the particular, remote cellular site.

Second, the automatic inventory provided by each of the remote cellular sites provides significant information, such as whether or not a particular FRU has an appropriate level of hardware and firmware to support new control software as an upgrade. In addition, the present invention provides that every change in the configuration of the remote cellular site may be monitored and tracked, such as the replacement of defective components, the repair history of various components, and aging information for warranty renewal.

Third, the utilization of this remote and automatic inventory allows for immediate creation of a centralized database. This also allows for a significant reduction in maintenance costs, allowing such inventory control and database creation without additional personnel and staffing. Such detailed and automatic knowledge, moreover, also provides for greater flexibility in management of the remote cellular site, including load balancing, adding or subtracting capabilities on an as needed basis.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for distributed inventory processing for remote communication sites, the method comprising:
   (a) obtaining an address of a field replaceable unit;
   (b) obtaining a status of the field replaceable unit;
   (c) when the status is out of service, obtaining recent physical location information for the field replaceable unit stored in a memory, wherein the recent physical location information comprises a recently stored frame, shelf and slot location; and
   (d) when the status is not out of service, querying the field replaceable unit through its address and receiving in response, from the field replaceable unit, its current vintage information and its current physical location information, wherein the current vintage information comprises a hardware version and a firmware version, and wherein the current physical location information comprises a current frame, shelf and slot location.

2. The method of claim 1, further comprising:
   (e) repeating steps (a) through (d), inclusive, for each field replaceable unit of a plurality of field replaceable units.

3. The method of claim 2, further comprising:
   (f) compiling inventory information for each field replaceable unit of the plurality of field replaceable units.

4. The method of claim 3, further comprising:
   (g) when a predetermined number of field replaceable units of the plurality of field replaceable units have been inventoried, transferring the compiled inventory information to a central site.

5. The method of claim 4, further comprising:
   generating a database from the compiled inventory information transferred to a central site.

6. The method of claim 4, further comprising:
   transferring the compiled inventory information from a plurality of remote sites to the central site.

7. The method of claim 5 wherein the compiled inventory information is encoded in a binary format compatible with a predetermined database implementation.

8. The method of claim 1, wherein the distributed inventory processing automatically commences at a predetermined time.

9. The method of claim 1, wherein the distributed inventory processing commences on demand.

10. The method of claim 1, further comprising:
    waiting for routine diagnostic procedures to be completed prior to commencing distributed inventory processing.

11. The method of claim 1, wherein the vintage information further comprises a software version.

12. The method of claim 1, wherein the vintage information includes one or more data fields containing CLEI, protocol, manufacturer, conditioning, installation date, physical description, or installing technician identifier information.

13. The method of claim 1, wherein the physical location information further comprises a remote site, floor, and bay location.

14. The method of claim 1, wherein step (d) further comprises querying the field replaceable unit for serial number information.

15. The method of claim 1, wherein step (c) further comprises resetting the status of the field replaceable unit to out of service.

16. The method of claim 1, wherein the address is obtained from a memory.

17. The method of claim 1, wherein the address is obtained by querying the field replaceable unit.

18. An apparatus for distributed inventory processing for remote communication sites, the apparatus comprising:

a an input output interface, the input output interface coupleable through a communication channel to a plurality of field replaceable units;

a memory; and a processor coupled to the input output interface and to the memory, wherein the processor includes instructions for obtaining an address and status from the memory of a first field replaceable unit of the plurality of field replaceable units; when the status is out of service, the processor having further instructions for obtaining recent physical location information for the first field replaceable unit, wherein the recent physical location information comprises a recently stored frame, shelf and slot location; and when the status is not out of service, the processor having further instructions for querying the first field replaceable unit through its address to obtain its current vintage information and its current physical location information, wherein the current vintage information comprises a hardware version and a firmware version. and wherein the current physical location information comprises a current frame, shelf and slot location.

19. The apparatus of claim 18, wherein the processor includes further instructions for obtaining an address and status from the memory of each field replaceable unit of the plurality of field replaceable units; the processor having further instructions for obtaining physical location information for each field replaceable unit having an out of service status;

and the processor having further instructions for querying each field replaceable unit having a status not out of service to obtain its vintage information and its physical location information.

20. The apparatus of claim 19, wherein the processor includes further instructions for compiling inventory information for each field replaceable unit of the plurality of field replaceable units and storing the compiled inventory information in the memory.

21. The apparatus of claim 20, wherein the processor includes further instructions for transferring the compiled inventory information to a central site when a predetermined number of field replaceable units of the plurality of field replaceable units have been inventoried.

22. The apparatus of claim 21, wherein the processor includes further instructions for generating a database from the compiled inventory information transferred to a central site.

23. The apparatus of claim 21, wherein the processor includes further instructions for transferring the compiled inventory information from a plurality of remote sites to the central site.

24. The apparatus of claim 18, further comprising:

a clock coupled to the processor; and wherein the processor receives a time signal from the clock and wherein the processor includes further instructions for commencing distributed inventory processing at a predetermined time.

25. The apparatus of claim 18, wherein the processor includes further instructions for commencing distributed inventory processing in response to a user initiation.

26. The apparatus of claim 18, wherein the processor includes further instructions for waiting for routine diagnostic procedures to be completed prior to commencing distributed inventory processing.

27. The apparatus of claim 18, wherein the vintage information further comprises a software version.

28. The apparatus of claim 18, wherein the vintage information includes one or more data fields containing CLEI, protocol, manufacturer, conditioning, installation date, physical description, or installing technician identifier information.

29. The apparatus of claim 18, wherein the physical location information further comprises a remote site, floor, and bay location.

30. The apparatus of claim 18, wherein the processor includes further instructions for querying the field replaceable unit for serial number information.

31. The apparatus of claim 18, wherein the processor includes further instructions for querying the field replaceable unit for address and status information.

32. A system for distributed inventory processing for remote communication sites, the system comprising:

a plurality of remote communication sites, each remote communication site of the plurality of remote communication sites having a plurality of field replaceable units;

a central site coupled through a communication channel to the plurality of remote communication sites, the central site having a processor and a memory, wherein the processor includes instructions for obtaining an address and status from the memory of each field replaceable unit of the plurality of field replaceable units; the processor having further instructions for obtaining, from the memory, recent physical location information for each field replaceable unit having an out of service status, wherein the recent physical location information comprises a recently stored frame, shelf and slot location; and the processor having further instructions for querying each field replaceable unit having a status not out of service, through each corresponding address, to obtain its current vintage information and its current physical location information, wherein the current vintage information comprises a hardware version and a firmware version, and wherein the current physical location information comprises a current frame, shelf and slot location.

33. The system of claim 32, wherein the processor includes further instructions for compiling inventory information for each field replaceable unit of the plurality of field replaceable units and storing the compiled inventory information in the memory.

34. The system of claim 33, wherein the processor includes further instructions for generating a database from the compiled inventory information transferred to the central site.

35. The system of claim 32, wherein the processor includes further instructions for commencing distributed inventory processing at a predetermined time.

36. The system of claim 32, further comprising:

an input terminal; and wherein the processor includes further instructions for commencing distributed inventory processing in response to a command entered in the input terminal.

37. The system of claim 32, wherein the processor includes further instructions for waiting for routine diagnostic procedures to be completed prior to commencing distributed inventory processing.

38. The system of claim 32, wherein the vintage information further comprises a software version.

39. The system of claim 32, wherein the vintage information includes one or more data fields containing CLEI, protocol, manufacturer, conditioning, installation date, physical description, or installing technician identifier information.

40. The system of claim 32, wherein the physical location information further comprises a remote site, floor, and bay location.

41. The system of claim 32, wherein the processor includes further instructions for querying each field replaceable unit for serial number information.

42. The system of claim 32, wherein the processor includes further instructions for querying each field replaceable unit for address and status information.

43. A system for distributed inventory processing for remote communication sites, the system comprising:

a central site having a central processor; and a plurality of remote communication sites coupled to the central site through a communication channels, each remote communication site of the plurality of remote communication sites having a plurality of field replaceable units; each remote communication site having a remote processor and a remote memory, wherein the remote processor includes instructions for obtaining an address and status from the memory of each field replaceable unit of the plurality of field replaceable units within each remote communication site; the remote processor having further instructions for obtaining, from the remote memory, recent physical location information for each field replaceable unit having an out of service status, wherein the recent physical location information comprises a recently stored frame, shelf and slot location; and the remote processor having further instructions for querying each field replaceable unit having a status not out of service, through each corresponding address, to obtain its current vintage information and its current physical location information, wherein the current vintage information comprises a hardware version and a firmware version, and wherein the current physical location information comprises a current frame, shelf and slot location.

44. The system of claim 43, wherein the remote processor has further instructions for compiling inventory information for a predetermined number of field replaceable units of the plurality of field replaceable units.

45. The system of claim 44, wherein the remote processor has further instructions, when the predetermined number of field replaceable units have been inventoried, for transferring the compiled inventory information to the central site.

46. The system of claim 45, wherein the central processor has instructions for generating a database from the compiled inventory information transferred to a central site.

47. The system of claim 46 wherein the compiled inventory information is encoded in a binary format compatible with a predetermined database implementation.

48. The system of claim 43, wherein the remote processor has further instructions to commence distributed inventory processing at a predetermined time.

49. The system of claim 43, wherein the central site further includes an input terminal; and wherein the central processor includes further instructions for commencing distributed inventory processing in response to a command entered in the input terminal.

50. The system of claim 43, wherein the vintage information further comprises a software version.

51. The system of claim 43, wherein the vintage information includes one or more data fields containing CLEI, protocol, manufacturer, conditioning, installation date, physical description, or installing technician identifier information.

52. The system of claim 43, wherein the physical location information further comprises a remote site, floor, and bay location.

53. The system of claim 43, wherein the remote processor further has instructions for querying the each field replaceable unit for serial number information.

54. The system of claim 43, wherein the remote processor includes further instructions for querying each field replaceable unit for address and status information.

* * * * *